United States Patent [19]

Halldorsson et al.

[11] Patent Number: 5,103,088
[45] Date of Patent: Apr. 7, 1992

[54] OPTICAL SENSOR DEVICE USING A DIELECTRIC TRANSPARENT SPHERICAL-SHELL SECTION

[75] Inventors: Thorsteinn Halldorsson; Konrad Altmann, both of Munich; Ernst A. Seiffarth, Taufkirchen, all of Fed. Rep. of Germany

[73] Assignee: Messerschmitt Bolkow Blohm GmbH, Fed. Rep. of Germany

[21] Appl. No.: 548,251

[22] Filed: Jul. 5, 1990

[30] Foreign Application Priority Data

Jul. 5, 1989 [DE] Fed. Rep. of Germany ....... 3922017

[51] Int. Cl.[5] .................................................. H01J 5/16
[52] U.S. Cl. ............................. 250/227.12; 250/227.31
[58] Field of Search ............... 250/227.31, 227.32, 250/227.12; 356/215, 218, 220, 222

[56] References Cited

U.S. PATENT DOCUMENTS

| | | | |
|---|---|---|---|
| 3,023,664 | 3/1962 | Coleman et al. | 356/218 |
| 4,140,544 | 2/1979 | Sill | 250/227.31 |
| 4,149,902 | 4/1979 | Mauer et al. | 250/227.31 |
| 4,150,285 | 4/1979 | Brienza et al. | 250/208.2 |
| 4,855,588 | 8/1989 | Holmes | 250/227.31 |

Primary Examiner—David C. Nelms
Assistant Examiner—Stephone B. Allen
Attorney, Agent, or Firm—Evenson, Wands, Edwards, Lenahan & McKeown

[57] ABSTRACT

An optical sensor device for recognizing optical irradiation and detecting its direction is constructed as a spherical-shell section from dielectric, optically transparent material. The irradiation penetrating into the spherical-shell section is reflected back and forth between the exterior and the interior surface or between a mirror and a thin shell via an air gap or vacuum gap, and is thus deflected to the shell edge. Since signals of different intensities are received at the irradiation detector at the beam edge according to the direction of incidence, the direction of incidence of the irradiation can be determined from the relationship of the signals.

26 Claims, 7 Drawing Sheets

...b

...c

OPTICAL SENSOR DEVICE USING A DIELECTRIC TRANSPARENT SPHERICAL-SHELL SECTION

BACKGROUND AND SUMMARY OF THE INVENTION

The present invention relates to an optical sensor device for recognizing optical irradiation and detecting its direction, and, more particularly, to an optical sensor device which measures transit time and determines signals by comparison of amplitudes.

DE-PS 33 23 828 and DE-OS 35 25 518 disclose sensors in which the direction of the incident laser irradiation is detected and determined by measurement of the transit time. In this case, the laser irradiation is guided in optical fibers. A very small number of detector elements and electronic circuits detect a large solid angle with a good angular resolution. However, this approach requires optical fibers which can operate in the whole spectral region of a possible laser threat.

In the range of from 0.4 $\mu$m to 2 $\mu$m, which detects the most frequent laser sources, such as ruby lasers, laser diodes, alexandrite lasers, Nd:YAG lasers, erbium and holmium lasers, etc., silicone dioxide glass fibers may be used. For bridging the range up to 4.5 $\mu$m, for example, in connection with deuterium fluoride laser (at 4.2 $\mu$m), optical fibers consisting of fluorides—such as zirconium fluoride—have been found to be suitable.

None of the mentioned optical glass fibers have, however, transmission properties which can be used in the militarily important spectral ranges of from 8 $\mu$m to 14 $\mu$m. In recent years, other types of optical fibers have been developed, such as fibers used as wave guides made of plastic materials and metals; fibers made of crystalline salts, such as NaCl, KCl; polycrystalline fibers consisting of Cs Br, Tl Ce, or chalcogenidic fibers consisting of AS, Ge, Se, Te. In comparison to optical fibers for the shorter wavelengths, however, the above-mentioned newer fibers still have considerable disadvantages, specifically high damping and susceptibility to moisture, toxicity which cannot be ignored and low flexibility. For this reason, it has not been possible to build laser warning sensors which can operate without any problems in the spectral range of from 8 $\mu$m to 14 $\mu$m.

It is an object of the present invention to provide a sensor which operates without any fibers or, at most, with those of short length and permits good angular resolution with a small number of detector elements also in a wide IR-range. Another object of the present invention is to provide such a sensor in which also a compact construction ensures a high optical sensitivity while, at the same time, being insensitive with respect to background light and scintillation of the laser beam in the atmosphere, and having a large dynamic range.

The foregoing objects have been achieved by constructing a sensor input lens system as a dielectric transparent spherical-shell section. In an embodiment, the shell surfaces of the section can comprise a thin shell surface, an air space or vacuum gap, and a totally reflecting mirror surface guiding incident irradiation by reflection to the edge of the spherical-shell section and from there directly to several electro-optical detectors so as to determine the direction of incidence from the relationship of the signals of the detectors. In another embodiment, the interior surface of the shell section can be vaporized so as to form a mirror which reflects impinging irradiation to the edge of the spherical-shell section.

BRIEF DESCRIPTION OF THE DRAWINGS

These and other objects, features and advantages will become more apparent from the following detailed description of several presently preferred embodiments of the present invention when taken in conjunction with the accompanying drawings wherein:

FIGS. 5a, 5b and 5c are three schematic representations of different embodiments of the devices for guiding the measuring signal of the edge radiation to the detector;

DETAILED DESCRIPTION OF THE DRAWINGS

Because of the increasing use of laser irradiation for fire guiding systems in combat and for surveying, marking and guiding, there is a growing demand for laser warning sensors in order to identify laser irradiation from the natural background and to be able to determine the position of the source of the irradiation on the ground or in the air. Since laser sources ranging from visible light into the medium IR-range of thermal irradiation are used today for such applications, warning sensors must also be usable for these spectral areas.

Up to now, neither optical glass fibers consisting of silicone dioxide, nor those made of zirconium fluoride can be used in the militarily very important spectral area of 8 $\mu$m to 14 $\mu$m. However, in this area, the wavelength of the $CO_2$-laser, which is becoming increasingly important as a distance measuring device, target marking device and guide beam source, is $\lambda = 10.6$ $\mu$m. Here, the present invention provides a solution by virtue of an unexpectedly simple concept for an optical sensor head which is based on the principle of a comparison of the amplitudes of optical signals.

It is assumed in this case that, when a targeted irradiation falls on a transparent plate of a dielectric, such as glass, a part of the irradiation transmitted through the plate, as a result of the refraction index difference between the air and the dielectric, is reflected back into the dielectric at the second surface; i.e., the irradiation S partly goes through the first surface, but partly is reflected back into the dielectric, where the process is repeated several times. The reflected back process-related proportion, i.e., which is reflected back at such surfaces, when the light beaming output impinges vertically on the plate, according to the Fresnel formula, is as follows:

$$I_r/I_o = (n-1)^2/(n+1)^2$$

In this case, n is the relationship of the refraction index of the dielectric and of the air. In the case of normal window glass with n=1.5, this proportion is approximately 4%; in the case of highly refractive glasses in the infrared range, such as germanium with n=4, it is approximately 36%. When a light beam concentration does not impinge vertically on a plane plate, the reflected proportion increases with the angle of incidence, and the light which is enclosed in the plate, as a result of the multiple reflection, travels to the edge of the plate. As illustrated in the following embodiments, this effect is used for determining the direction of incidence of the irradiation if, instead of a plane plate consisting of a dielectric, a spherical-shell section is used. For this purpose, three different embodiments are presently contemplated.

Figure 2:
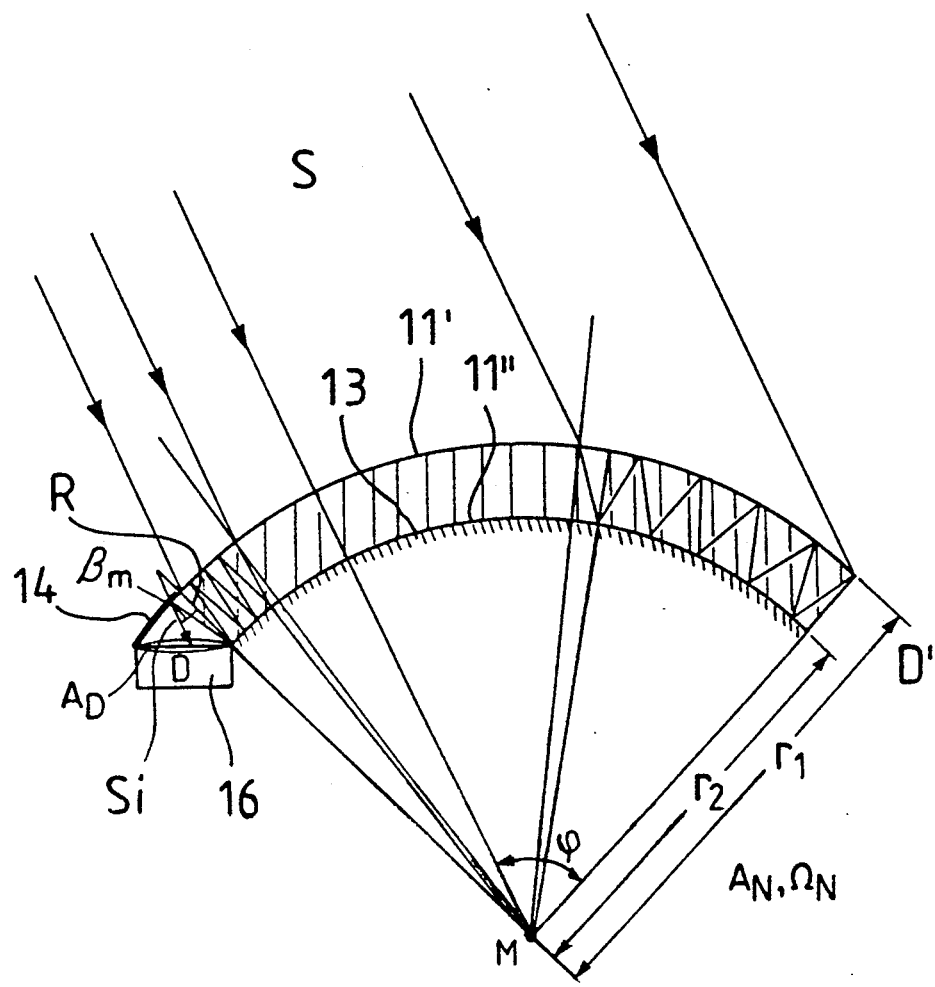
FIG. 2 is a schematic sectional elevational view of an input lens system of the laser warning sensor according to a first embodiment of the present invention.
Figure 2A:
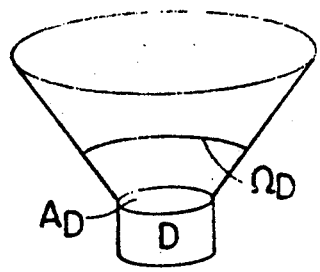
FIG. 2a is a schematic of the detector showing the detector surface and detector acceptance angle.

The first embodiment shown in FIG. 2 comprises a dielectric material spherical shell section 11. The incident irradiation S impinges on this spherical-shell section 11 having an exterior surface 11' and an interior surface 11" with respective radii $r_1$ and $r_2$. Relative to the center M of the sphere forming the section 11, the spherical shell-sections have an opening angle of $\pi/2$.

Figure 1:
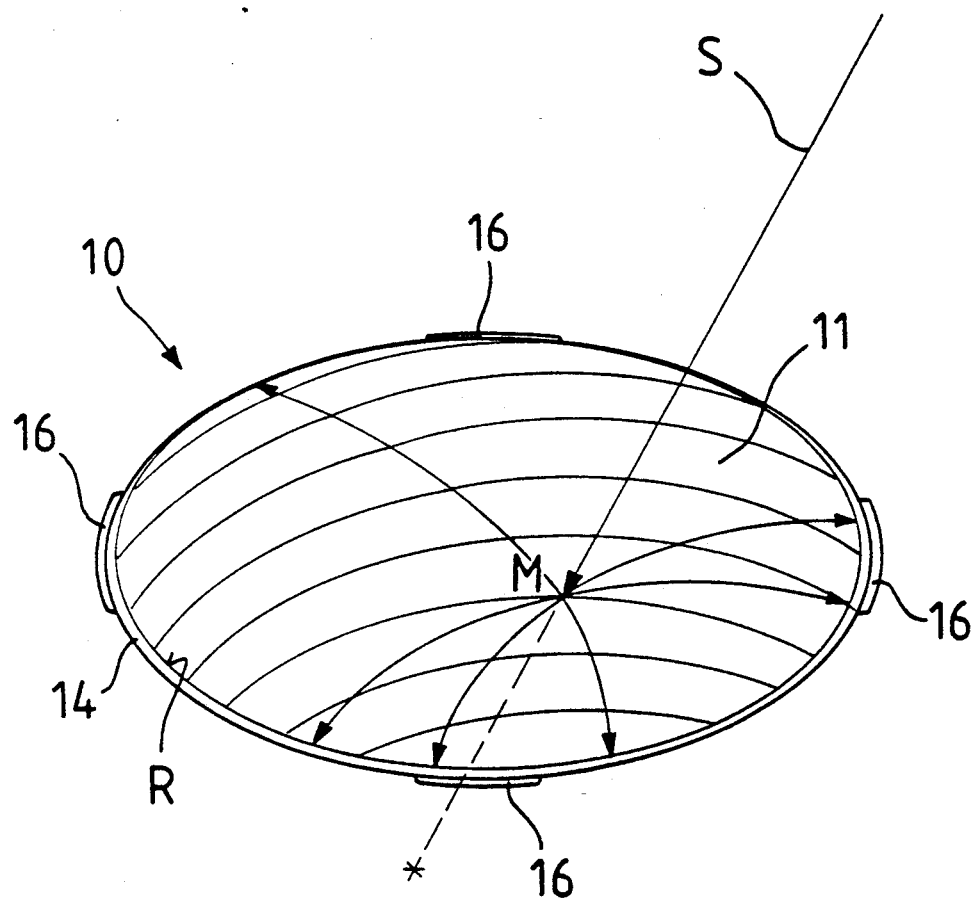
FIG. 1 is a schematic perspective view showing propagation to an edge of a sensor shell of a central light beam impinging on the sensor disk.

The interior surface 11' in FIG. 2 can be vaporized 13 so that the impinging irradiation S is reflected completely. A portion of the irradiation which passes through the exterior surface 11' is repeatedly reflected back and forth between the the surface, moves away from the point of impingement. In a two-dimensional view, as illustrated in FIG. 1, the part of the beam concentration S which, on the right of the beam, impinges through the spherical-section center point M, travels to the right, and the part impinging on the left of M travels to the left. As a function of the angle of incidence $\psi$ of the full beam concentration, different signals therefore arrive at the right and at the left end of the spherical-shell section which are either supplied directly to a detector 16, or enter into wave guides 15 (FIG. 5b) connected with the detector 16, for determining the angle of incidence.

Figure 3:
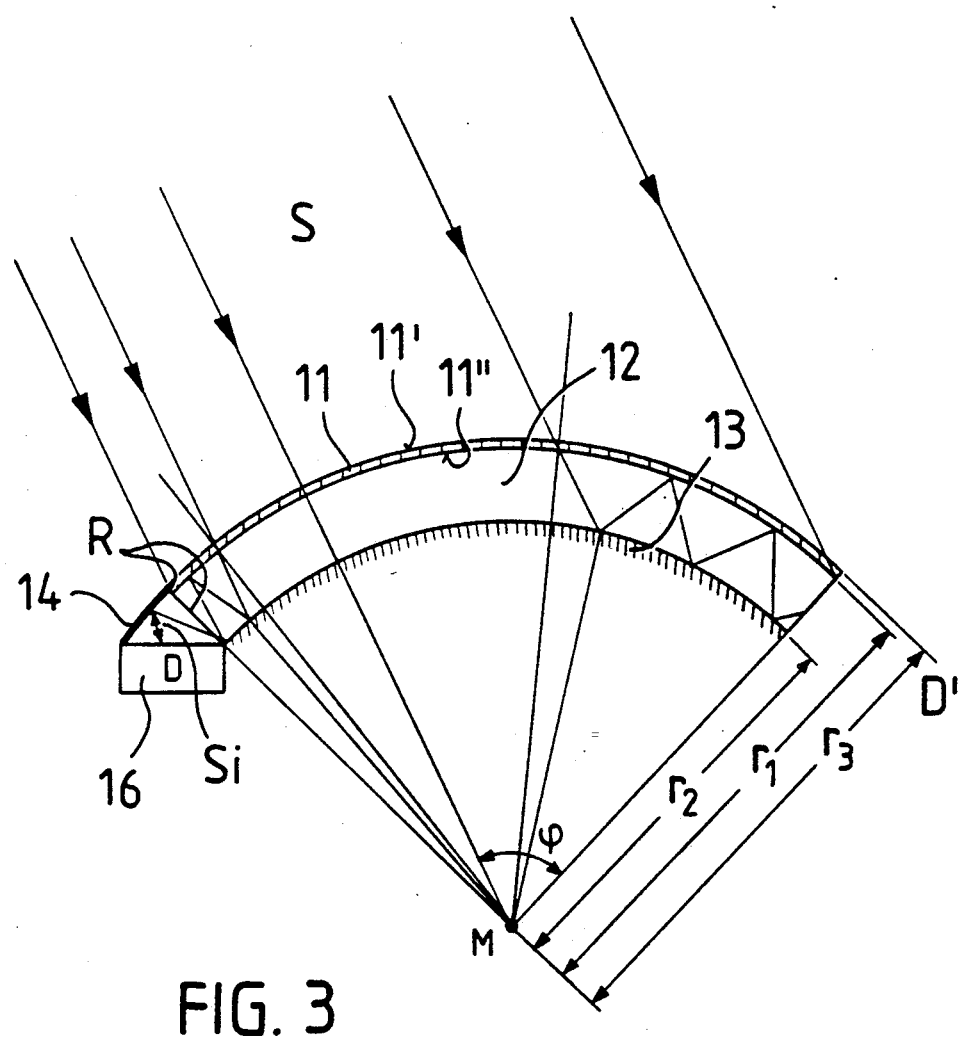
FIG. 3 is a schematic sectional elevational view of an input lens system of the laser warning sensor according to a second embodiment of the present invention.

The embodiment according to FIG. 3 provides an air or vacuum gap 12 with a thickness $_1-r_2$ disposed between the vaporized surface 13 with the radius $r_2$ and the dielectric, i.e., the transparent, thin spherical-shell section 11. The dielectric 11 has a thickness, $r_3-r_1$, and is connected only by way of the surface with the radius $r_1$. The dielectric 11 is preferably completely dereflected toward the outside so that the arriving incident beams, from the outside, can penetrate into it virtually without any reflection losses. The air or vacuum gap 12, not the dielectric 11 itself, is used in this embodiment for the transverse diverting of the incident irradiation.

An arriving beam is refracted toward the surface normal when entering the dielectric 11 and is refracted away from the surface normal when leaving the dielectric 11. If, as illustrated in FIG. 3, the thickness of the dielectric 11 is small, the directions of the surface normal differ only a small amount of the entry and the exit point. The resulting change of direction of the beam S is therefore negligible, so that it may be assumed that it penetrates the dielectric practically with only a parallel displacement.

Figure 4:
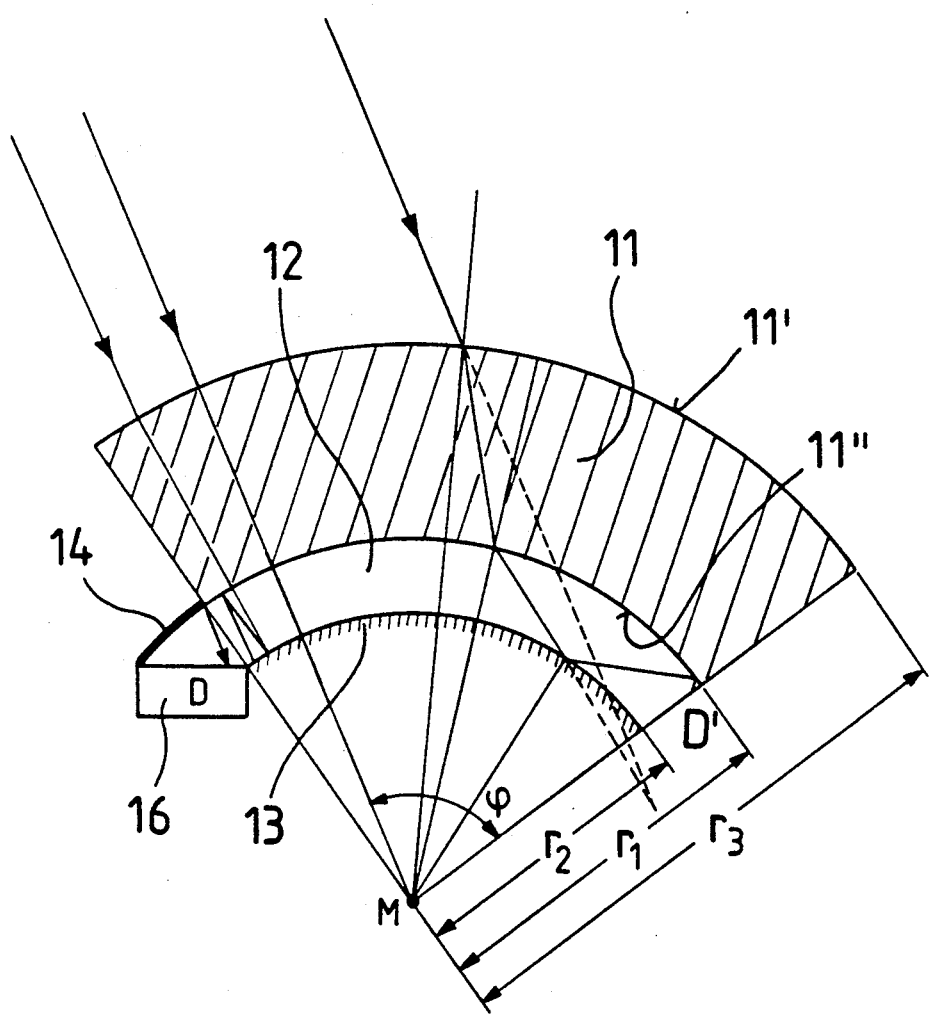
FIG. 4 is a schematic sectional view of an input lens system of the laser warning sensor according to a third embodiment of the present invention.

Another embodiment of the present invention has a thick dielectric transparent spherical-shell section 11 as shown in FIG. 4. After the beam S has passed through the spherical-shell section 11 in this embodiment, a clear change of direction takes place with a larger inclination with respect to the surface normal. The beam therefore reaches the edge of the air or vacuum gap 12 after a much smaller number of reflections at the totally reflecting mirror surface 13.

It will be readily apparent to one skilled in this art that the three-dimensional device, which is not shown in FIGS. 2 to 4, is merely a result of rotation of the spherical-shell section 11 around the beaming axis to the center of the spherical shell, i.e., when the shell is viewed from above the beams extend radially out the penetration point M onto the shell surface toward the edges, as outlined in FIG. 1.

For catching or capturing a 90° angular area, a 90° segment of the spherical-shell section 11 is required. When the optical irradiation is transmitted to the opto-electronic detectors, the surface distribution and angular distribution of the irradiation must be taken into account. The beams are distributed over the edge surface in a largely homogeneous manner. However, the exit angle at the edge R is limited to a fixed angular area around the normal line with respect to the spherical-shell section 11, either toward the outside or toward the inside, as a function of whether the last reflection takes place at the interior 11" or out the exterior shell 11'.

In the embodiment of FIG. 2, the critical angle is $\beta_m$ for a 90° angle catch, thus with angles of incidence of $\alpha_m = \pm 45°$, $$\beta_m = \sin \alpha_m / n$$

where "n" is the refraction index of the spherical-shell material. As seen in FIG. 2, $\beta_m$ is the angle between line MR and the arrow $S_i$ pointing to the detector surface $A_D$. For example, in the case of n=1.45 (quartz glass) $\beta_m = 29.2°$, and in the case of n=4 (qermanium) $\beta_m = 10.2°$. So that beams at the edge R, which are directed toward the outside, reach the detector 16, a ring 14 which reflects back to the inside is provided at this edge R and deflects these beams in the direction of the detector 16.

Figure 5A:
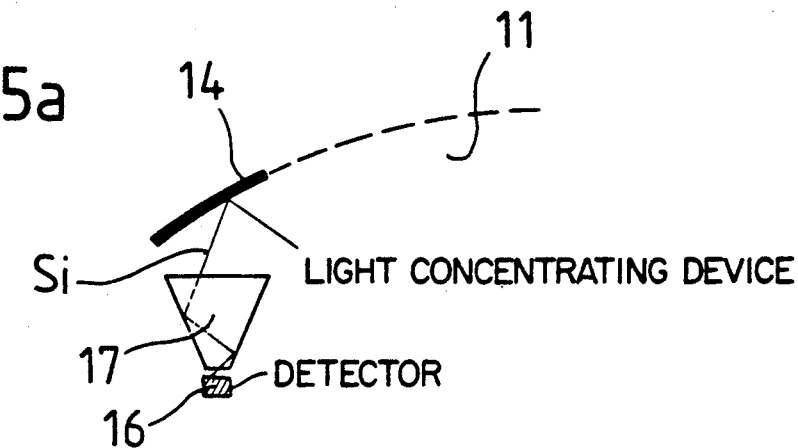
Figure 5A:
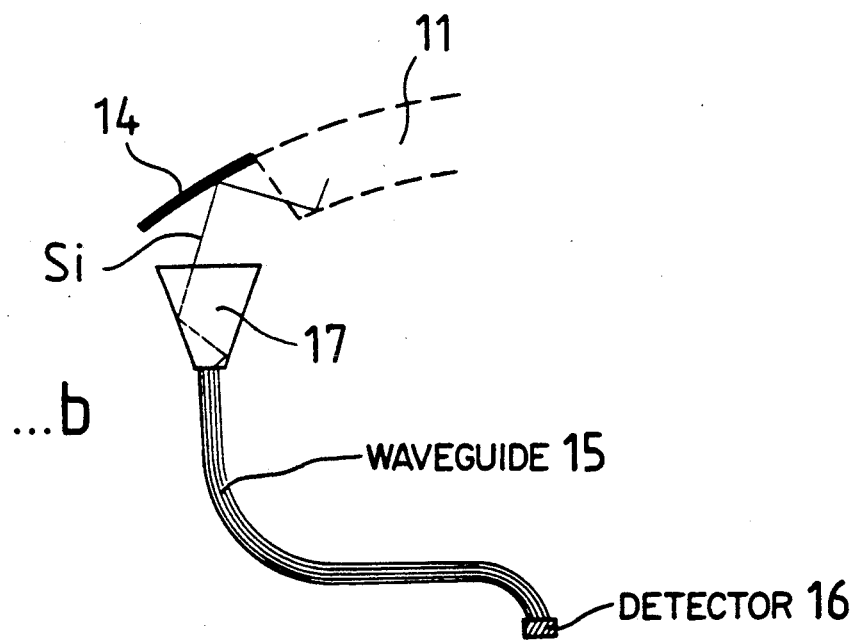
Figure 5A:
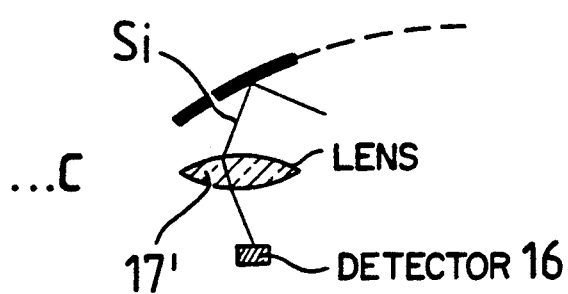

In the embodiment according to FIG. 3, the critical angle is approximately $\alpha_m - 45°$; and in the third embodiment according to FIG. 4, the critical angle is larger than 45°. In these two embodiments, a beam deflection is also advantageous because of the fact that as much a possible of the useful light is offered to the detector 16. Since all light, which after the deflection comes out of the edge zone R, is distributed in a relatively narrow angular range—viewed in the two-dimensional cross-sectional plane—it is advantageous for the concentration of beams Si to be concentrated on the detector by a lens 17' (FIG. 5c) or other types of light concentrating devices 17 (FIG. 5a and 5b).

After such imaging, with an optimal adaptation to the surface and the acceptance angle of the detector 16, the size of the useful surface at the mirror edge amounts to:

$$A_N = A_D \Omega_D / \Omega_N$$

Herein, $A_D$ is the surface of the detector; $\Omega_D$ is the solid acceptance angle of the detector, i.e., the solid angle for which the detector surface $A_D$ is in effect; and $\Omega_N$ is the radiating angle of the edge zone R, i.e., the solid angle for which the outlet surface of the spherical-shell section is in effect. FIGS. 5a–c shows three embodiments for the imaging of the concentration of beams on a detector 16, or the entry surfaces of an optical fiber bundle 15 which is connected with a detector 16 which is placed at a certain distance from the spherical-shell section 11.

For the use of the dielectric spherical-shell sections 11 as an input lens system of a sensor with a sufficiently high irradiation sensitivity and a good angular resolution, the following are required: A sufficient intensity of irradiation a the edge R of the shell for the detection of the incident laser irradiation S; the irradiation relationship at the detectors must be such that there is a clear determination of the angle of incidence; and insensitivity of the detection with respect to the scintillation of the laser beam by atmospheric turbulences and to possible polarization of the laser irradiation.

A detailed calculation of the distribution of intensity at the edge of the spherical-shell sections 11 at different radii, shell densities, refraction indices and embodiments of the shells shows that with spherical radii in the range of from 2 to 3 cm, with an angle of incidence of $\psi$–45°, an intensity, i.e., intensity of irradiation, exists which has the same magnitude as the intensity of light impinging on the spherical shells.

In the case of a smaller or a larger $\psi$, the signal rises on one side of the edge R and falls on the other side of the edge R. This means that with relatively small shells 11 or with a diameter of from 2–3 cm, intensity relationships are to be expected at the detector by way of the irradiation conversion in the shell as they occur in the case of a direct irradiation of the detector without any preliminary lens system.

The advantage of the shell is the fact that the intensity relationship on the left and on the right at the edge represents a monotonously or continuously rising function of the angle of incidence; that is, because of the limited angular distribution of the irradiation at the edge of the shell, the signals, are also considerably increased by the enlargement of the shell radius.

Figure 6:
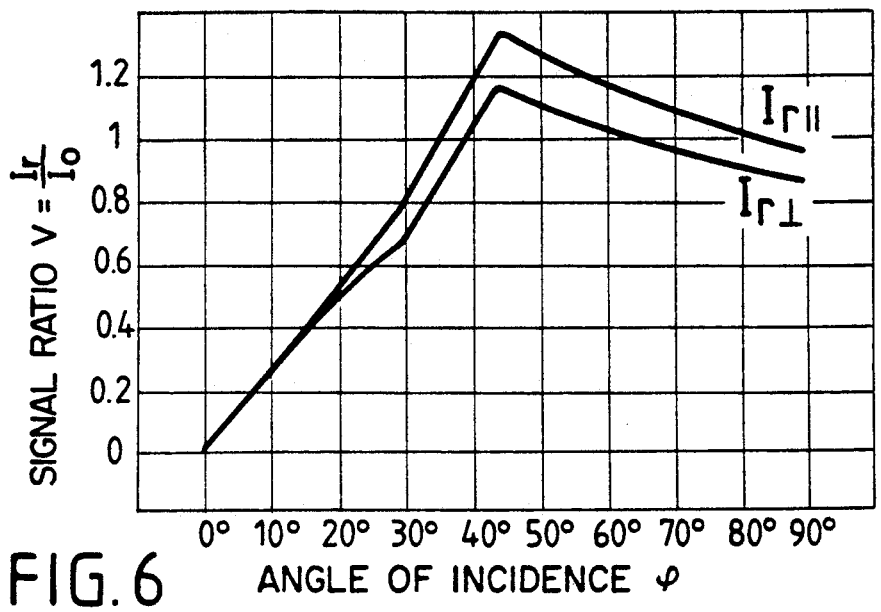
FIG. 6 is a graph of the light intensity of a double-shell sensor according to the present invention.

FIG. 6 shows an example of the parameters of a typical embodiment of a spherical-shell sensor for long-wave infrared light with germanium as the spherical-shell material. The ratio of intensity of the laser irradiation at the edge $I_r$, to the incident light intensity $I_o$ is plotted as a function of the angle of incidence $\psi$ of 0° to 90° for the embodiments of FIGS. 3 and 4 of a double shell with a vacuum gap. As shown by the curves, the signals for the two polarization directions $I_{rII}$ and $I_{r\perp}$ which are vertical with respect to one another differ insignificantly in this case; thus both reach a maximum at approximately 1.2.

Figure 7:
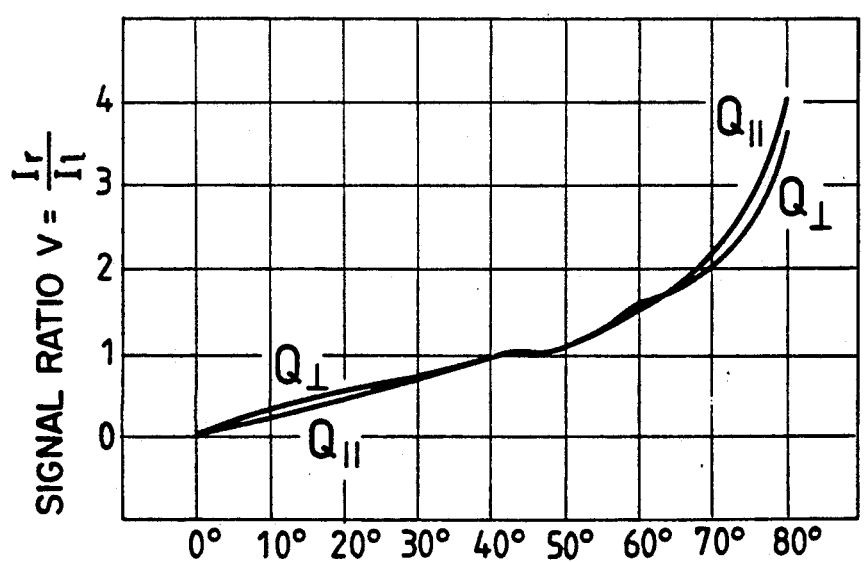
FIG. 7 is a graph of the relationship of the optical signals at the double-shell sensor according to FIG. 6.
Figure 8:
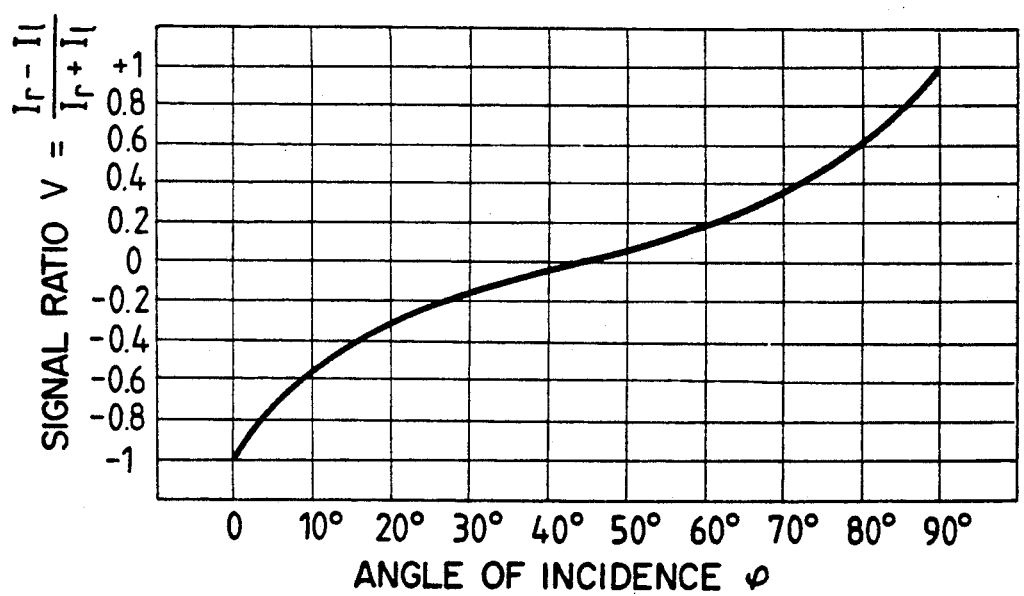
FIG. 8 is a graph of the signal relationship "V" of the intensities at the double-shell sensor according to FIG. 6.

The relationship of both signals a the left and right edge Q increases continuously with the angle of incidence from 0° to 80° signal ratio by a signal ratio factor, $I_r/I_1$, of 0 to 4. So that the disturbing asymptomatic increase of the signal at 90° is eliminated, the relationship $$V = I_r - I_1/I_r + I_1$$

is used as the practical measuring value. FIG. 7 shows V, the signal ratio, as a function of the angle of incidence $\psi$: $V = V(\psi)$. $Q_{||}$ is the parallel part of the intensity $I_o$ of the impinging light, and $Q_\perp$ is the perpendicular part therof, specifically in each case, relative to the normal surface line (the impinging direction of the beam). $I_r$ and $I_{||}$ are the right and left parts, respectively, of the impinging overall intensity $I_o$, and are in turn separated into their parallel components, $I_r ||$, $I_r \perp$ and perpendicular components, $I_{||}$, $I_\perp$.

In addition to the positive factor that the function course extends almost symmetrically by 45°, the difference of the signal relationships of the two polarization directions around the level of incidence of the irradiation on the shell can no longer be distinguished. Of course, the relationship V does not extend linearly with the angle of incidence. However, since the function course is determined only by the geometric and optical parameters of the shell, this course, which is determined by calculation or measurement, can be taken into account during signal processing, and the angle of incidence can be clearly determined from each signal relationship V.

The measurement of the signal amplitude at the detectors at the edge of the shell sensor may be determined by various known electronic measuring methods, such as Amplitude Peak Detection or Sample and Hold Detection. As is generally customary nowadays, the further processing of signals takes place through microprocessor technology.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An optical sensor device for recognizing optical irradiation and detecting a direction of the irradiation by measuring transit time and comparing amplitudes, comprising a dielectric transparent spherical-shell section, having shell surfaces and an edge, and a totally reflecting mirror surface, for guiding the incident irradiation by reflection to the edge, and at least one opto-electrical detector operatively arranged in relation to the section for receiving the guided incident radiation and issuing signals for determining a direction of incidence of the irradiation.

2. The optical sensor device according to claim 1, wherein a mirror ring guides the incident radiation from the edge to the at least one detector.

3. The optical sensor device according to claim 1, wherein wave guides beam guide the incident radiation from the edge to the at least one detector.

4. The optical sensor device according to claim 2, wherein the mirror surface is provided at one of the shell surfaces.

5. The optical sensor device according to claim 2, wherein the section comprises shell surfaces defining a thin shell, and a space is provided between the shell and the mirror surface.

6. The optical sensor device according to claim 5, wherein the space constitutes one of an air space and a vacuum gap.

7. The optical sensor device according to claim 4, further comprising means for determining, from the irradiation course of the at least one detector, parameters of the irradiation.

8. The optical sensor device according to claim 7, wherein the parameters include wavelength, duration of irradiation and repeating frequency.

9. The optical sensor device according to claim 5, further comprising means for determining, from the irradiation course of the at least one detector, parameters of the irradiation.

10. The optical sensor device according to claim 4, wherein an interior one of the shell surfaces is metallic and constitutes the mirror surface, and, directly at the edge, an optical signal, which is reflected between the shell surfaces, is supplied to the at least one detector.

11. The optical sensor device according to claim 10, further comprising means for determining, from the irradiation course of the at least one detector, parameters of the irradiation.

12. The optical sensor device according to claim 5, wherein the dielectric transparent spherical-shell section has such a thickness that the irradiation penetrates a first one of the shell surface and a second one of the shell surfaces with a predetermined beam displacement and, after travelling through the space, is reflected back by the mirror surface in the form of a metallic spherical surface to the second shell surface, and the proportion of the incident irradiation reflected back and forth between these two surfaces is supplied to the at least one detector.

13. The optical sensor device according to claim 12, wherein the space constitutes one of an air space and a vacuum gap.

14. The optical sensor device according to claim 1, an entry surface of the at least one detector is one of a convex surface of the section and the concave interior surface of the section.

15. The optical sensor device according to claim 14, wherein the mirror surface is provided at one of the shell surfaces.

16. The optical sensor device according to claim 14, wherein the section comprises shell surfaces defining a thin shell and a space is provided between the shell and the mirror surface.

17. The optical sensor device according to claim 15, further comprising means for determining, from the irradiation course of the at least one detector, parameters of the irradiation.

18. The optical sensor device according to claim 17, wherein an interior one of the shell surfaces is metallic and constitutes the mirror surface, and, directly at the edge, an optical signal, which is reflected between the shell surfaces, is supplied to the at least one detector.

19. The optical sensor device according to claim 16, wherein the dielectric transparent spherical-shell section has such a thickness that the irradiation penetrates a first one of the shell surfaces and a second one of the shell surfaces with a predetermined beam displacement and, after travelling through the space, is reflected back by the mirror surface in the form of a metallic spherical surface to the second shell surface, and the proportion of the incident irradiation reflected back and forth between these two surfaces is supplied to the at least one detector.

20. The optical sensor device according to claim 10, wherein the optical signal of the irradiation at the edge between two reflecting interfaces is supplied directly to the at least one detector.

21. The optical sensor device according to claim 20, wherein the optical signal of the irradiation a the edge between two reflecting interfaces is supplied directly to the at least one detector.

22. The optical sensor device according to claim 20, wherein the optical signal of the irradiation a the edge between the two reflecting interfaces is supplied to at least one wave guide operatively connected with the at least one detector.

23. The optical sensor device according to claim 21, wherein the optical signal of the irradiation at the edge between the two reflecting interfaces is supplied to at least one wave guide operatively connected with the at least one detector.

24. The optical sensor device according to claim 21, wherein auxiliary means are provided for receiving the optical signal of the irradiation at the edge of the space between the reflecting surfaces for improved signal concentration.

25. The optical sensor according to claim 24, wherein the means includes one or more of beam deflectors and light concentrating lenses.

26. The optical sensor device according to claim 1, the dielectric transparent spherical-shell section, is rotatable around the beam axis to the center of the spherical shell.

* * * * *